Patented Aug. 13, 1935

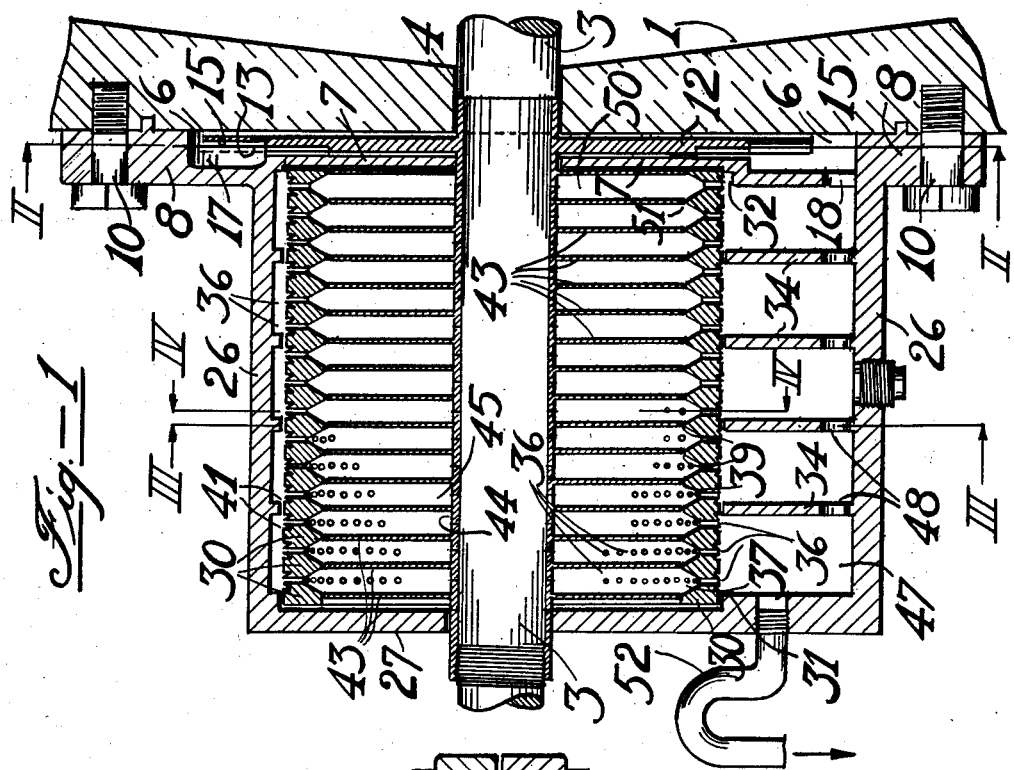
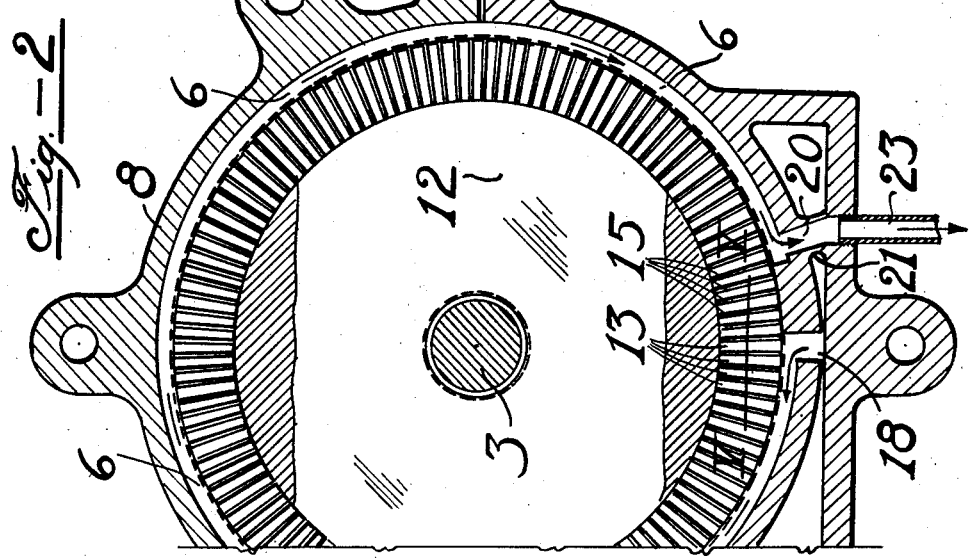

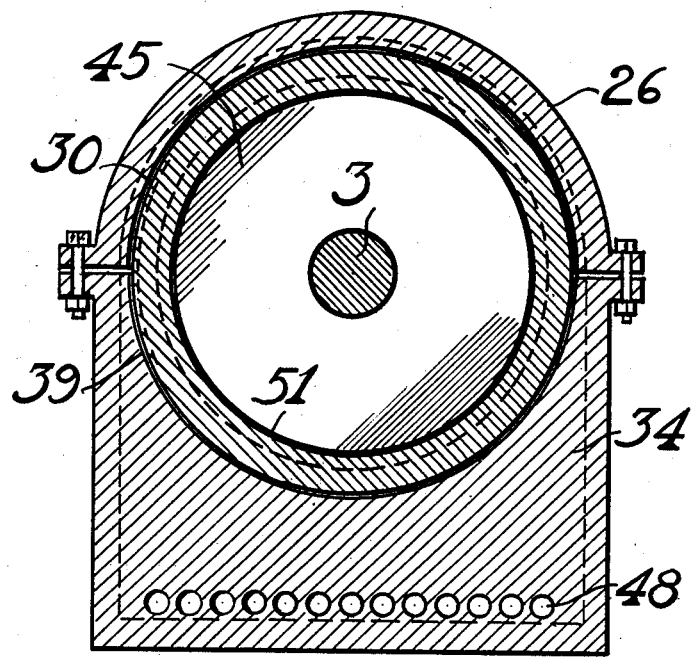
Fig.-3
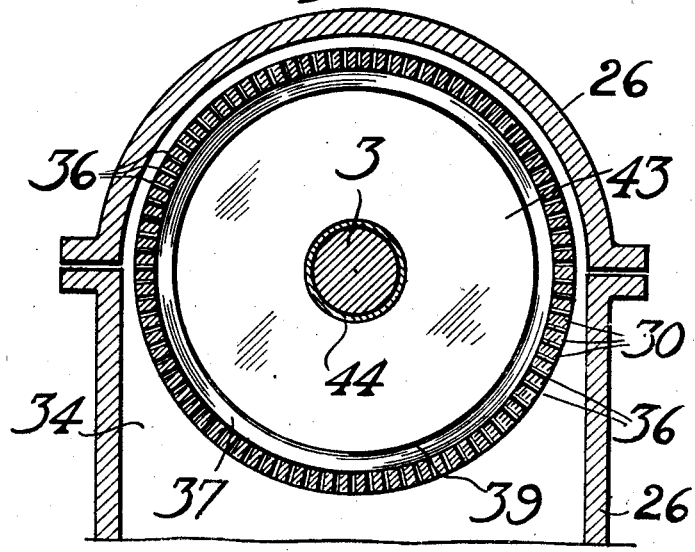
Fig.-5
Fig.-4
Dirk J. Vandermeer Inventor
By W. E. Currie Attorney

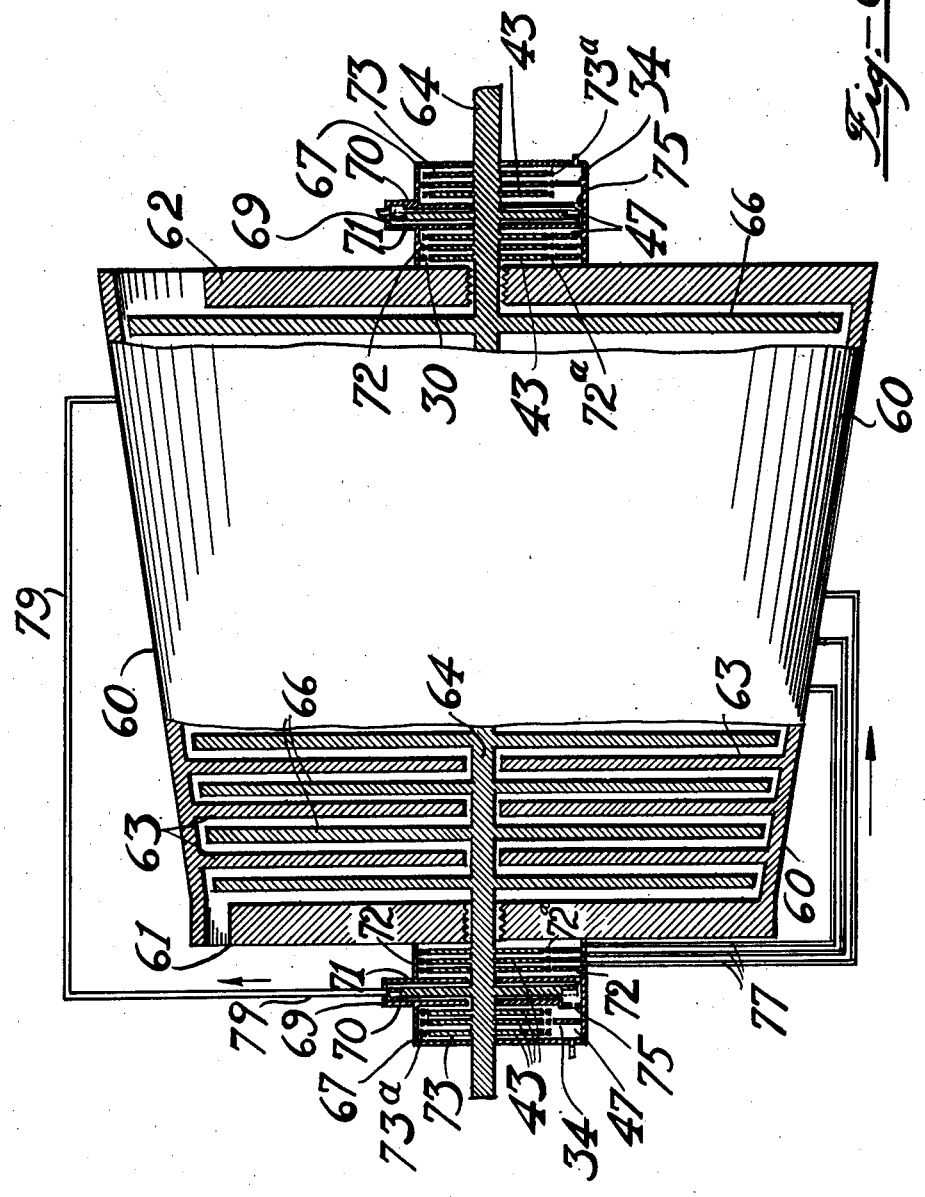

2,011,206

UNITED STATES PATENT OFFICE 2,011,206

SEAL FOR ROTARY SHAFTS

Dirk J. Vandermeer, Toronto, Ontario, Canada, assignor to Standard Oil Development Company, a corporation of Delaware Application June 22, 1934, Serial No. 731,924

3 Claims. (Cl. 286—9)

This invention relates to a seal for use with a rotary shaft such as the rotary shaft of a centrifugal pump handling a liquid at a high pressure differential.

It is an object of this invention to provide a seal for a rotary shaft, which seal can be used, irrespective of the pressure differential inside and outside of the housing to be overcome. It is a further object to provide a seal which will not leak, which can be used with a number of different fluids and which shall be easy to construct.

Other objects will be apparent from the specification and from the accompanying drawings in which latter—

Fig. 1 is a longitudinal sectional view of one form of seal constructed in accordance with the invention;

Fig. 2 is a transverse sectional view taken along the line II—II of Fig. 1;

Fig. 3 is a transverse sectional view taken along the line III—III of Fig. 1;

Fig. 4 is a transverse sectional view taken along the line IV—IV of Fig. 1;

Fig. 5 is a transverse sectional view taken along the line V—V of Fig. 2; and

Fig. 6 is a longitudinal sectional view partly in section and partly in elevation of a turbine provided with a modified form of seal.

Referring particularly to Figs. 1 to 5 of the drawings, a seal or gland is shown applied to the casing 1 of the centrifugal pump handling a fluid. A rotary shaft 3 protrudes through the wall 1 of the pump casing. The pump casing is adapted to contain a fluid under a high pressure differential as compared with the atmospheric pressure exteriorly of the casing. A slight amount of clearance 4 is provided between the shaft 3 and the casing 1.

Fluid leaking through the clearance 4 passes into a pump chamber 6 which encircles the shaft 3 exteriorly of and adjoining the casing 1. The pump chamber 6 is formed by a wall 7 carrying an annular flange 8 which is secured against the end wall of the casing 1 by means of bolts 10. A pump wheel is mounted upon the shaft 3 within the pump chamber 6. The pump wheel comprises a disc 12 having a plurality of substantially radially extending slots 13 in its periphery forming radially extending blades 15. The periphery of the pump wheel 12 is spaced from the annular flange 8 to form an annular passageway 17 which extends from an inlet opening 18 in the bottom of the wall 7 of the pump chamber to a discharge opening 20. The flange 8 is provided with a shoulder portion 21 which protrudes radially inwardly from the flange to prevent communication between the inlet 18 and the outlet 20 except through the passageway 17. A return conduit 23 leads from the discharge opening 20 of the pump chamber through the wall of the casing 1 into the interior of the casing to return fluid under pressure which has leaked from the casing 1 through the clearance 4 back into the casing 1.

Fluid leaking through the clearance 4 and pump chamber 6 is collected by the following arrangement of parts: A housing 26 for the shaft protrudes outwardly from the wall 7 of the pump chamber 6 and terminates in an end wall 27. The housing contains a cylindrical seal ring 30 which is supported within the housing upon shoulders 31 and 32 which protrude inwardly from the walls 27 and 7 respectively. The cylindrical seal ring 30 is supported also by means of baffle ribs 34 which are disposed substantially vertically within the bottom of the housing 26 and are provided with a circular upper surface adapted to receive the cylindrical seal ring 30. The cylindrical seal ring 30 is provided with a plurality of substantially radially extending holes 36 which extend through the ring around the periphery of the ring to permit flow of fluid through the cylindrical seal ring. The cylindrical seal ring is provided upon its inner surface with a plurality of annular V shaped grooves 37 which communicate with the holes. The walls of the grooves 37 converge to form sealing surfaces at 39. The exterior surface of the cylindrical seal ring is provided with a plurality of annular recesses 41 adapted to receive and conduct liquid around the periphery of the seal ring. The liquid leaking into the housing 26 is hurled radially outwardly by means of a plurality of fin wheels. Each fin wheel comprises a blade 43 mounted upon a hub 44 and providing a suitable space 45 constituting a fin. The blades 43 are spaced from each other by means of the hub 44 and are lined with the sealing surfaces 39 of the cylindrical seal ring.

The fluid hurled outwardly by the fin wheels through the openings 36 passes around the cylindrical seal ring into the reservoir 47 at the bottom of the housing 26 and beneath the cylindrical seal ring. The baffle plates 34 are provided with a plurality of openings 48 to permit communication between the different parts of the reservoir. The reservoir 47 communicates with the pump chamber 6 through the opening 18 to permit leakage fluid to be passed into the pump chamber. The first fin wheel 43 is spaced from the pump chamber wall 7 to form a space 50.

When fluid enters the chamber 50, a portion of the fluid drops to the openings 36 and enters the reservoir 47. Another portion of the leakage fluid is hurled through the upper openings 36 and falls into the grooves 41. This fluid follows the grooves 41 around the cylindrical seal ring to the reservoir 47. The remaining fluid escapes from the chamber 50 through the clearance 51 and enters the next succeeding space between the fin wheels where the above process is repeated. This operation continues until all, or practically all the fluid finds its way into the reservoir 47 and is pumped back within the casing 1 by the pump wheel 12. A discharge line 52 leads from the reservoir 47 to a suitable place of disposal, not shown. The discharge line 52 opens into the reservoir above the bottom level of the pump blades 15.

Referring particularly to Fig. 6 of the drawings, a turbine is shown which comprises a casing 60 having a supply head 61 and an exhaust head 62. A plurality of diaphragms 63 protrude radially inwardly from the casing 60 into spaced relationship with a rotary shaft 64. The diaphragms 63 increase in diameter toward the low pressure end of the turbine. The several diaphragms 63 divide the interior of the turbine into stages within each of which a bucket wheel 66 rotates.

A packing gland is provided for the shaft 64 at opposite ends of the turbine. The packing gland comprises a housing 67 for the shaft which protrudes outwardly from the wall 61 of the casing. A pump chamber 69 is formed in an intermediate portion of the housing 67 by means of walls 70 and 71. The pump chamber 69 divides the housing into an inner container 72 and an outer container 73. A perforated cylindrical seal ring, identical in all respects with the seal ring described in Figs. 1 to 5 inclusive, is disposed within each container 72 and 73. Each cylindrical seal ring 72a and 73a is spaced from the walls of the housing 67, as described in connection with Figs. 1 to 5 inclusive, to form a passage around each ring, and a reservoir 47 is provided beneath each seal ring communicating with the passage. The chamber wall 70 adjoining the outer container 73 is provided with an opening 75 leading from the bottom of the reservoir 47 into the pump chamber 69 to permit flow of leakage liquid from the outer reservoir into the pump chamber. A plurality of fin wheels 43, identical with those previously described in connection with Figs. 1 to 5 inclusive, are mounted upon the shaft 64 within each container 72 and 73 to hurl the leakage liquid through the perforations of the cylindrical seal ring whereby it flows into the reservoirs and pump chamber. Baffle plates 34 are provided within each reservoir identical with those described in connection with Figs. 1 to 5 inclusive. Return conduits 77 lead from the inner reservoir 72 to the interior of the turbine whereby the liquid in the inner reservoir is returned to portions of the turbine, the contents of which are under lesser pressure than are the contents of the reservoir 72. A return conduit 79 leads from the pump chamber outlet to the turbine whereby the liquid in the pump chamber is returned under pressure to the turbine.

In the operation of the device, the fin wheels 43 in the outer container 73 dispose of the clearance leakage of the pump wheel fluid. The fin wheels 43 in the inner container 72 collect steam and condensate in the respective reservoirs. From these reservoirs the condensate is conducted by pipe 77 to the portions of the turbine having a lower pressure. For the low pressure side of the turbine the arrangement is the same excepting that the sealing liquid from the pump wheel tends to pass over toward the vacuum portion of the turbine. The pump wheel in either the high pressure or the low pressure gland of the turbine acts merely as a seal by means of recirculating a suitable fluid, for example, distilled water.

Various changes may be made within the scope of the appended claims in which it is desired to claim all novelty inherent in the invention as broadly as the prior art permits.

I claim:

1. In combination with a casing adapted to contain liquid under pressure and a rotary shaft protruding through the casing, a packing gland for sealing the shaft against leakage comprising a pump chamber encircling the shaft exteriorly of the casing in position to receive liquid leaking from the casing between the shaft and casing, a pump wheel mounted on the shaft within the chamber, a housing for the shaft protruding outwardly from the chamber, a perforated cylindrical seal ring in the housing spaced from the walls of the housing to form a passage around the ring and a reservoir below the ring opening into the pump chamber to receive the leakage liquid, a plurality of fin wheels having blades spaced from each other mounted on the shaft within the seal ring to hurl the leakage liquid through the perforations whereby the liquid flows into the reservoir and pump chamber, and a return conduit from the pump chamber outlet to the casing whereby the liquid is returned under pressure to the casing.

2. In combination with a casing adapted to contain liquid under pressure and a rotary shaft protruding through the casing, a packing gland for sealing the shaft against leakage comprising a pump chamber encircling the shaft exteriorly of and adjoining the casing to receive liquid leaking from the casing between the shaft and casing, a pump wheel mounted on the shaft within the chamber, a housing for the shaft protruding outwardly from the chamber, a perforated cylindrical seal ring in the housing spaced from the walls of the housing to form a passage around the ring and a reservoir below the ring communicating with the passage, the chamber wall having an opening leading into the bottom of the reservoir to permit flow of leakage liquid from the reservoir into the pump chamber, a plurality of fin wheels having blades spaced from each other mounted on the shaft within the seal ring to hurl the liquid through the perforations whereby it flows into the reservoir and pump chamber, and a return conduit from the pump chamber outlet to the casing whereby the liquid in the pump chamber is returned under pressure to the casing.

3. In combination with the casing of a turbine and a rotary shaft protruding through the casing, a packing gland for sealing the shaft against leakage comprising a housing for the shaft protruding outwardly from the casing, a pump chamber in an intermediate portion of the housing dividing the housing into inner and outer containers, a perforated cylindrical seal ring in each container spaced from the walls of the housing to form a passage around each ring and a reservoir below each ring communicating with the passage, the chamber wall adjoining the outer container having an opening leading into the bottom of the reservoir to permit flow of leakage liquid from the outer reservoir into the pump chamber, a plurality of fin wheels having blades spaced from each other mounted on the shaft within each seal ring to hurl the leakage liquid through the perforations whereby it flows into the reservoirs and pump chamber, a return conduit from the inner reservoir to the casing whereby the liquid in the inner reservoir is returned to the casing, and a return conduit from the pump chamber outlet to the casing whereby the liquid in the pump chamber is returned under pressure to the casing.

DIRK J. VANDERMEER.